(12) United States Patent
Chang et al.

(10) Patent No.: US 11,133,770 B2
(45) Date of Patent: Sep. 28, 2021

(54) MOTOR DRIVE SYSTEM AND CONTROL METHOD THEREFOR

(71) Applicant: Delta Electronics, Inc., Taoyuan (TW)

(72) Inventors: Yi-Jan Chang, Taoyuan (TW); Yi-Kai Chou, Taoyuan (TW); Po-Sung Chiang, Taoyuan (TW); Chien-Hao Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/900,326

(22) Filed: Jun. 12, 2020

(65) Prior Publication Data

US 2020/0403552 A1 Dec. 24, 2020

Related U.S. Application Data

(60) Provisional application No. 62/863,998, filed on Jun. 20, 2019.

(51) Int. Cl.
*H02P 29/024* (2016.01)

(52) U.S. Cl.
CPC .................................. *H02P 29/024* (2013.01)

(58) Field of Classification Search
CPC ............................... H02P 29/024; H02M 7/00
See application file for complete search history.

(56) References Cited

U.S. PATENT DOCUMENTS

| 9,209,718 B2 * | 12/2015 | Sykes | H02P 3/02 |
| 2002/0063548 A1 | 5/2002 | Schwesig | |
| 2012/0161689 A1 * | 6/2012 | Yamasaki | H02P 25/22 |
| | | | 318/724 |
| 2015/0295524 A1 * | 10/2015 | Kangas | H02P 29/02 |
| | | | 318/452 |
| 2017/0163202 A1 * | 6/2017 | Sarkimaki | H02P 29/02 |
| 2017/0163602 A1 | 6/2017 | Douglass et al. | |
| 2017/0214357 A1 | 7/2017 | Yang et al. | |
| 2017/0346436 A1 * | 11/2017 | Hara | B62D 5/0463 |
| 2018/0062556 A1 * | 3/2018 | Yue | B62D 5/0463 |
| 2018/0123498 A1 * | 5/2018 | Tanabe | H02P 27/08 |
| 2018/0269869 A1 | 9/2018 | Mukhopadhyay et al. | |
| 2019/0097522 A1 | 3/2019 | Wada | |

FOREIGN PATENT DOCUMENTS

| CN | 106842004 A | 6/2017 |
| CN | 106877291 A | 6/2017 |
| CN | 206685883 U | 11/2017 |
| CN | 207884588 U | 9/2018 |
| CN | 208522667 U | 2/2019 |
| CN | 109428585 A | 3/2019 |
| CN | 110620543 A | 12/2019 |
| TW | 201421893 A | 6/2014 |
| TW | 201843081 A | 12/2018 |

* cited by examiner

*Primary Examiner* — Rina I Duda

(74) *Attorney, Agent, or Firm* — Kirton McConkie; Evan R. Witt

(57) ABSTRACT

A motor drive system and a control method are provided. The motor drive system is electrically connected to a motor. The motor drive system includes two safe torque off (STO) modules to achieve a two-channel STO redundancy infrastructure, so as to improve the safety of the motor drive system. In addition, the motor drive system includes a diagnosis module to diagnose malfunction of the STO modules. It ensures the STO modules to meet the related safety requirements.

15 Claims, 7 Drawing Sheets

MOTOR DRIVE SYSTEM AND CONTROL METHOD THEREFOR

This application claims the benefit of U.S. Provisional Application No. 62/863,998 filed on Jun. 20, 2019, and entitled "Safety Torque Off Circuits". The entireties of the above-mentioned patent application are incorporated herein by reference for all purposes.

FIELD OF THE INVENTION

The present disclosure relates to a motor drive system, and more particularly to a motor drive system having two safety torque off (STO) modules for achieving a two-channel STO redundancy infrastructure, and diagnosing malfunction of the two STO modules. The present disclosure also relates to a control method for the motor drive system.

BACKGROUND OF THE INVENTION

In prior art technology, in order to avoid an accidental starting of an electrical motor or an accident involving personal injury, a motor drive system and the related products, such as an inverter and a servo motor drive, are provided with a safety torque off (STO) function, so as to meet the safety requirements. The STO function enables the electrical motor to reach a torque-free state. Namely, the STO function can be used to stop the electrical motor for an actuation process of such as overheating protection, overspeed protection or emergency stop of the electrical motor, and can also be used to avoid an unexpected starting-up and actuation.

Therefore, there is a need for providing a motor drive system having two STO modules for achieving a two-channel STO redundancy infrastructure, and diagnosing malfunction of the two STO modules. It benefits to improve the safety of the STO circuit, and perform a fault diagnosis in advance when the STO circuits may have malfunctions that prevent normal operation.

SUMMARY OF THE INVENTION

An object of the present disclosure is to provide a motor drive system and a control method therefor, which includes two STO modules to achieve a two-channel STO redundancy infrastructure, so as to improve the safety of the motor drive system. In addition, the motor drive system further diagnoses malfunction of the STO modules, so as to diagnose whether there is a failure problem with the STO modules. Moreover, it benefits to improve the safety of the STO modules, and perform a fault diagnosis in advance when the STO module may have malfunctions, so as to ensure the STO modules to meet the related safety requirements of the average diagnostic coverage (DCavg) and the safe failure fraction (SFF).

In accordance with an aspect of the present disclosure, a motor drive system for driving a motor is provided. The motor drive system comprises a control unit, a first safe torque off (STO) module, a second safe torque off (STO) module, a first gate driving circuit, a second gate driving circuit and a diagnosis module. The first STO module comprises a first coupling module and is electrically connected to the control unit for receiving a first control signal from the control unit, and the first STO module converts the first control signal to a first driving signal. The second STO module comprises a second coupling module and is electrically connected to the control unit for receiving a second control signal from the control unit, and the second STO module converts the second control signal to a second driving signal. The first gate driving circuit is electrically connected to the first STO module for receiving the first driving signal, the first gate driving circuit drives a high-voltage side switch, and the high-voltage side switch is electrically connected to the motor. The second gate driving circuit is electrically connected to the second STO module for receiving the second driving signal, the second gate driving circuit drives a low-voltage side switch, and the low-voltage side switch is electrically connected to the motor. The diagnosis module comprises a microcontroller and is electrically connected to the first STO module and the second STO module for capturing the first driving signal and the second driving signal respectively, and the diagnosis module compares the first driving signal and the second driving signal to output a compared result. The microcontroller determines whether at least one of the first STO module and the second STO module is malfunctioned according to the compared result.

In accordance with another aspect of the present disclosure, a control method for a motor drive system is provided. The control method comprises steps of: outputting, by a control unit, a first control signal and a second control signal to a first safe torque off (STO) module and a second STO module respectively; outputting, by the first STO module, a first driving signal according to the first control signal; outputting, by the second STO module, a second driving signal according to the second control signal; comparing, by a diagnosis module, the first driving signal and the second driving signal to output a compared result to a microcontroller; determining, by the microcontroller, that the first STO module and the second STO module are operated normally according to the compared result in which the first driving signal and the second driving signal are identical when the first control signal and the second control signal are at the same voltage level; and determining, by the microcontroller, malfunction of at least one of the first STO module and the second STO module according to the compared result in which the first driving signal and the second driving signal are distinct when the first control signal and the second control signal are at the same voltage level.

The above contents of the present disclosure will become more readily apparent to those ordinarily skilled in the art after reviewing the following detailed description and accompanying drawings, in which:

DETAILED DESCRIPTION OF THE
PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
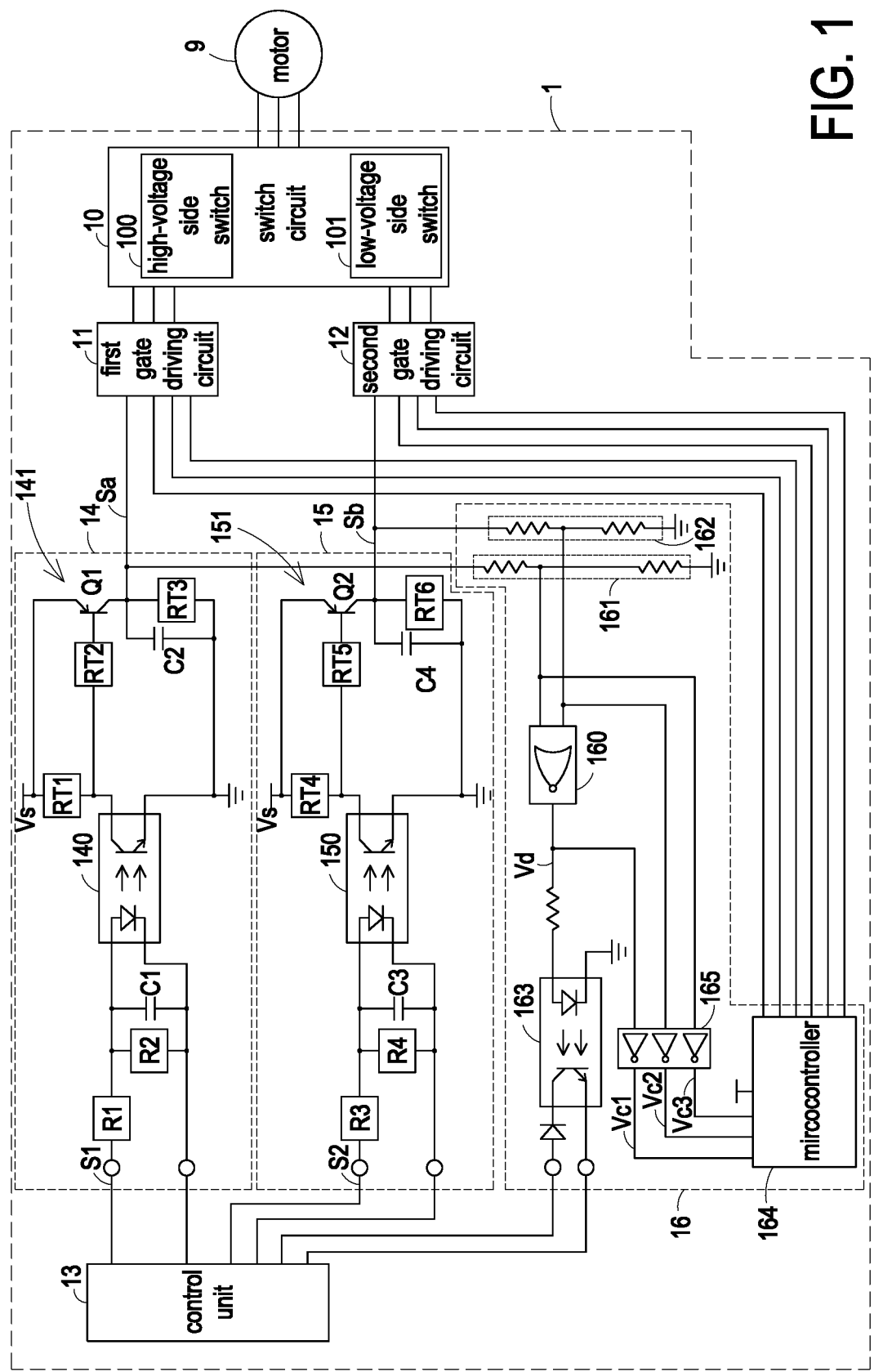
FIG. 1 is a circuit diagram illustrating a motor drive system according to a first embodiment of the present disclosure.
Figure 2:
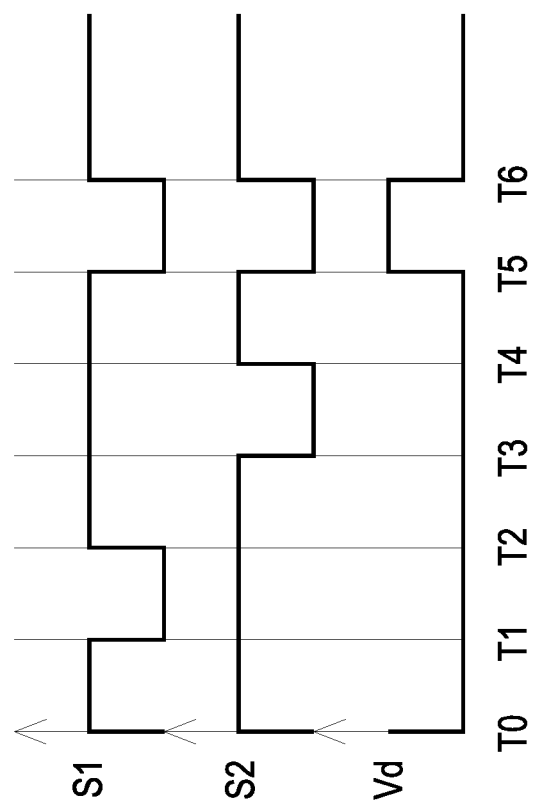
FIG. 2 is a timing diagram of a first control signal, a second control signal, and a diagnostic signal shown in FIG. 1.

FIG. 1 is a circuit diagram illustrating a motor drive system according to a first embodiment of the present disclosure. FIG. 2 is a timing diagram of a first control signal, a second control signal, and a diagnostic signal shown in FIG. 1. As shown in FIG. 1 and FIG. 2, the motor drive system 1 is electrically connected to a motor 9, and drives the motor 9 to operate. Preferably but not exclusively, the motor drive system 1 is applied to an elevator equipment, and the motor 9 is used to move the elevator of the elevator equipment. The motor drive system 1 includes a switch circuit 10, a first gate driving circuit 11, a second gate driving circuit 12, a control unit 13, a first safe torque off (STO) module 14, a second STO module 15 and a diagnosis module 16. The switch circuit 10 is electrically connected to the motor 9, and includes a high-voltage side switch 100 and a low-voltage side switch 101. Preferably but not exclusively, the high-voltage side switch 100 and the low-voltage side switch 101 are formed by an insulated gate bipolar transistor (IGBT), respectively. When the high-voltage side switch 100 and the low-voltage side switch 101 are operated to be alternately turned on and turned off, the switch circuit 10 drives the motor 9 to operate.

The first gate driving circuit 11 is electrically connected to the high-voltage side switch 100, and drives the high-voltage side switch 100 to operate according to a first pulse width modulation signal during an actuation. The second gate driving circuit 12 is electrically connected to the low-voltage side switch 101, and drives the low-voltage side switch 101 to operate according to a second pulse width modulation signal during an actuation. Preferably but not exclusively, the control unit 13 includes a programmable logic controller (PLC). In the embodiment, the control unit 13 is performed in an operating mode or in a diagnostic mode. While the control unit 13 is performed in the operating mode or the diagnostic mode, a first control signal S1 and a second control signal S2 are outputted from the control unit 13 by utilizing the PLC.

In some embodiments, when the control unit 13 is performed in the operating mode, the motor drive system 1 is actuated, and the motor 9 is operated or not. Furthermore, when the control unit 13 is performed in the operating mode, and the motor drive system 1 is kept in a normal operating state, the control unit 13 outputs the first control signal S1 and the second control signal S2 at a first logic voltage level, said a high voltage level, respectively, so as to allow the motor 9 to operate. For example, when the motor 9 needs to stop the operation immediately due to the safety protection measures, the control unit 13 is performed in the operating mode, the motor drive system 1 is operated in an emergency state, and the control unit 13 outputs the first control signal S1 and the second control signal S2 at a second logic voltage level, said a low voltage level, respectively, so as to stop the operation of the motor 9. In addition, when the control unit 13 is performed in the diagnostic mode, the motor drive system 1 is actuated at this time, but the motor 9 is not operated, and the control unit 13 outputs the first control signal S1 having voltage levels switched between the first logic voltage level and the second logic voltage level, and outputs the second control signal S2 having voltage levels switched between the first logic voltage level and the second logic voltage level. The control unit 13 diagnoses whether any of the first STO module 14 and the second STO module 15 is malfunctioned according to comparison of the voltage levels. Thus, a safety diagnosis of the internal circuit in the motor drive system 1 is performed. In the embodiment, when the control unit 13 is performed in the operating mode, the first control signal S1 and the second control signal S2 are identical. Preferably but not exclusively, when the control unit 13 is performed in the diagnostic mode, the first control signal S1 and the second control signal S2 are not identical, said distinct. Moreover, in the embodiment, the first logic voltage level is a high-voltage level, and the second logic voltage level is a low-voltage level, but the present disclosure is not limited thereto.

In the embodiment, the first STO module 14 is electrically connected between the control unit 13 and the first gate driving circuit 11, and controls the actuation of the first gate driving circuit 11. Preferably but not exclusively, when the control unit 13 is performed in the operating mode and outputs the first control signal S1 at the first logic voltage level, the first STO module 14 correspondingly outputs a first driving signal Sa to actuate the first gate driving circuit 11. Thus, the first gate driving circuit 11 is actuated to drive the high-voltage side switch 100 to operate according to the first pulse width modulation signal. Preferably but not exclusively, when the control unit 13 is performed in the operating mode and outputs the first control signal S1 at the second logic voltage level, the first STO module 14 correspondingly outputs a first driving signal Sa to deactivate the first gate driving circuit 11. Thus, the high-voltage side switch 100 stops the operation. In addition, when the control unit 13 is performed in the diagnostic mode, the first control signal S1 has a voltage level switched between the first logic voltage level and the second logic voltage level. Therefore, when the first STO module 14 is performed in a normal operation, the first driving signal Sa outputted from the first STO module 14 is also switched between two different logic voltage levels correspondingly.

In the embodiment, the second STO module 15 is electrically connected between the control unit 13 and the second gate driving circuit 12, and controls the actuation of the second gate driving circuit 12. Preferably but not exclusively, when the control unit 13 is performed in the operating mode and outputs the second control signal S2 at the first logic voltage level, the second STO module 15 correspondingly outputs a second driving signal Sb to actuate the second gate driving circuit 12. Thus, the second gate driving circuit 12 is actuated to drive the low-voltage side switch 101 to operate according to the second pulse width modulation signal. Preferably but not exclusively, when the control unit 13 is performed in the operating mode and outputs the second control signal S2 at the second logic voltage level, the second STO module 15 correspondingly outputs a second driving signal Sb to deactivate the second gate driving circuit 12. Thus, the low-voltage side switch 101 stops the operation. In addition, when the control unit 13 is performed in the diagnostic mode, the second control signal S2 has a voltage level switched between the first logic voltage level and the second logic voltage level. Therefore, when the second STO module 15 is performed in a normal operation, the second driving signal Sb outputted from the second STO module 15 is also switched between two different logic voltage levels correspondingly. In some embodiments, the circuit topologies of the first STO module 14 and the second STO module 15 are the same, but the present disclosure is not limited thereto. In addition, preferably but not exclusively, the first pulse width modulation signal and the second pulse width modulation signal are three-phase pulse width modulation signals, respectively.

In the embodiment, the diagnosis module 16 is electrically connected to the control unit 13, the first STO module 14 including the first coupling module and the second STO module 15 including the second coupling module, and includes a NOR gate circuit 160. When the diagnosis module 16 captures the first driving signal Sa outputted by the first STO module 14 and the second driving signal Sb outputted by the second STO module 15, the NOR gate circuit 160 of the diagnosis module 16 performs a first NOR operation of the first driving signal Sa and the second driving signal Sb to output a diagnostic signal Vd and sends the diagnostic signal Vd back to the control unit 13 according to the result of the first NOR operation. Thus, the control unit 13 diagnoses whether any of the first STO module 14 and the second STO module 15 is malfunctioned according to the diagnostic signal Vd.

In some embodiments, the diagnosis module 16 selectively outputs the first pulse width modulation signal to the first gate driving circuit 11, or outputs the second pulse width modulation signal to the second gate driving circuit 12. Therefore, when the first gate driving circuit 11 is actuated and receives the first pulse width modulation signal, the first gate driving circuit 11 correspondingly drives the high-voltage side switch 100 to turn on and turn off according to the first pulse width modulation signal. Similarly, when the second gate driving circuit 12 is actuated and receives the second pulse width modulation signal, the second gate driving circuit 12 correspondingly drives the low-voltage side switch 101 to turn on and turn off according to the second pulse width modulation signal.

In the embodiment, the first STO module 14 includes a first current-limiting resistor R1, a second current-limiting resistor R2, a first filtering capacitor C1, a first optical coupler 140 of the first coupling module and a first conversion circuit 141. The first current-limiting resistor R1 includes a first terminal and a second terminal, and the first terminal of the first current-limiting resistor R1 is electrically connected to the control unit 13. The second current-limiting resistor R2 includes a first terminal and a second terminal. The first terminal of the second current-limiting resistor R2 is electrically connected to the second terminal of the first current-limiting resistor R1, and the second terminal of the second current-limiting resistor R2 is electrically connected to the control unit 13. The first filtering capacitor C1 is connected in parallel with the second current-limiting resistor R2. The first optical coupler 140 of the first coupling module includes an input terminal and an output terminal. The input terminal of the first optical coupler 140 of the first coupling module is electrically connected between the second terminal of the first current-limiting resistor R1 and the control unit 13. The first conversion circuit 141 is electrically connected between the output terminal of the first optical coupler 140 of the first coupling module and the first gate driving circuit 11, and outputs the first driving signal Sa according to the first control signal S1. In the embodiment, the first conversion circuit 141 includes a first regulating resistor RT1, a second regulating resistor RT2, a third regulating resistor RT3, a first PNP bipolar transistor Q1 and a first voltage-stabilizing capacitor C2. The first regulating resistor RT1 includes a first terminal and a second terminal, the first terminal of the first regulating resistor RT1 is electrically connected to the output terminal of the first optical coupler 140 of the first coupling module, and the second terminal of the first regulating resistor RT1 is electrically connected to the voltage source Vs. The second regulating resistor RT2 includes a first terminal and a second terminal, the first terminal of the second regulating resistor RT2 is electrically connected between the first terminal of the first regulating resistor RT1 and the output terminal of the first optical coupler 140 of the first coupling module. The first PNP bipolar transistor Q1 includes a base electrode, an emitter electrode and a collector electrode. The base electrode of the first PNP bipolar transistor Q1 is electrically connected to the second terminal of the second regulating resistor RT2, the emitter electrode of the first PNP bipolar transistor Q1 is electrically connected to the voltage source Vs, and the collector electrode of the first PNP bipolar transistor Q1 is electrically connected to the first gate driving circuit 11. Moreover, the first driving signal Sa is formed by a voltage on the collector electrode of the first PNP bipolar transistor Q1. The first voltage-stabilizing capacitor C2 is electrically connected between the collector electrode of the first PNP bipolar transistor Q1 and the ground terminal. The third regulating resistor RT3 is electrically connected between the collector electrode of the first PNP bipolar transistor Q1 and the ground terminal.

In the embodiment, the second STO module 15 includes a third current-limiting resistor R3, a fourth current-limiting resistor R4, a second filtering capacitor C3, a first optical coupler 150 of the second coupling module and a second conversion circuit 151. The third current-limiting resistor R3 includes a first terminal and a second terminal, and the first terminal of the third current-limiting resistor R3 is electrically connected to the control unit 13. The fourth current-limiting resistor R4 includes a first terminal and a second terminal. The first terminal of the fourth current-limiting resistor R4 is electrically connected to the second terminal of the third current-limiting resistor R3, and the second terminal of the fourth current-limiting resistor R4 is electrically connected to the control unit 13. The second filtering capacitor C3 is connected in parallel with the fourth current-limiting resistor R4. The first optical coupler 150 includes an input terminal and an output terminal. The input terminal of the first optical coupler 150 is electrically connected between the second terminal of the third current-limiting resistor R3 and the control unit 13. The second conversion circuit 151 is electrically connected between the output terminal of the first optical coupler 150 of the second coupling module and the second gate driving circuit 12, and outputs the second driving signal Sb according to the second control signal S2. In the embodiment, the second conversion circuit 151 includes a fourth regulating resistor RT4, a fifth regulating resistor RT5, a sixth regulating resistor RT6, a second PNP bipolar transistor Q2 and the second voltage-stabilizing capacitor C4. The fourth regulating resistor RT4 includes a first terminal and a second terminal, the first terminal of the fourth regulating resistor RT4 is electrically connected to the output terminal of the first optical coupler 150, and the second terminal of the fourth regulating resistor RT4 is electrically connected to the voltage source Vs. The fifth regulating resistor RT5 includes a first terminal and a second terminal, the first terminal of the fifth regulating resistor RT5 is electrically connected between the first terminal of the fourth regulating resistor RT4 and the output terminal of the first optical coupler 150. The second PNP bipolar transistor Q2 includes a base electrode, an emitter electrode and a collector electrode. The base electrode of the second PNP bipolar transistor Q2 is electrically connected to the second terminal of the fifth regulating resistor RT5, the emitter electrode of the second PNP bipolar transistor Q2 is electrically connected to the voltage source Vs, and the collector electrode of the second PNP bipolar transistor Q2 is electrically connected to the second gate driving circuit 12. Moreover, the second driving signal Sb is formed by a voltage on the collector electrode of the second PNP bipolar transistor Q2. The second voltage-stabilizing capacitor C4 is electrically connected between the collector electrode of the second PNP bipolar transistor Q2 and the ground terminal. The sixth regulating resistor RT6 is electrically connected between the collector electrode of the second PNP bipolar transistor Q2 and the ground terminal.

In some embodiments, the diagnosis module 16 further includes a first voltage-dividing circuit 161, a second voltage-dividing circuit 162 and a third optical coupler 163. In the embodiment, the first voltage-dividing circuit 161 is electrically connected between an output terminal of the first STO module 14 and the NOR gate circuit 160. Preferably but not exclusively, the first voltage-dividing circuit 161 includes two voltage-dividing resistors connected in series. When the first STO module 14 outputs the first driving signal Sa, the first voltage-dividing circuit 161 divides the first driving signal Sa, and transmits the first driving signal Sa divided to the NOR gate circuit 160. The second voltage-dividing circuit 162 is electrically connected between an output terminal of the second STO module 15 and the NOR gate circuit 160. Preferably but not exclusively, the second voltage-dividing circuit 162 includes two voltage-dividing resistors connected in series. When the second STO module 15 outputs the second driving signal Sb, the second voltage-dividing circuit 162 divides the second driving signal Sb, and transmits the second driving signal Sb divided to the NOR gate circuit 160. The third optical coupler 163 is electrically connected between the NOR gate circuit 160 and the control unit 13 for transmitting the diagnostic signal Vd from the NOR gate circuit 160 to the control unit 13.

As shown in FIG. 2, in some embodiments, when the control unit 13 is performed in a diagnostic mode, the first control signal S1 has voltage levels switched between a first logic voltage level and a second logic voltage level during a diagnosis period. For example, in the time interval from time point T0 to the time point T6, the voltage level of the first control signal S1 is switched between the high-voltage level and the low-voltage level, in some embodiments the high-voltage level is one and the low-voltage level is zero. Similarly, the second control signal S2 has voltage levels switched between the first logic voltage level and the second logic voltage level during the diagnosis period. The voltage level of the second control signal S2 is switched between the high-voltage level and the low-voltage level, in some embodiments the high-voltage level is one and the low-voltage level is zero. During the diagnosis period, the first control signal S1 and the second control signal S2 are cooperated with each other to formed four sets of logical expressions. While in the first kind of logical expressions, the first control signal S1 is at the first logic voltage level and the second control signal S2 is at the first logic voltage level, which are presented as logical expressions (1, 1), as shown in the time interval from time point T0 to the time point T1.

As to the second kind of logical expressions, the first control signal S1 is at the second logic voltage level and the second control signal S2 is at the first logic voltage level, which are presented as logical expressions (0, 1), as shown in the time interval from time point T1 to the time point T2. While in the third kind of logical expressions, the first control signal S1 is at the first logic voltage level and the second control signal S2 is at the second logic voltage level, which are presented as logical expressions (1, 0), as shown in the time interval from time point T3 to the time point T4. As to the fourth kind of logical expressions, the first control signal S1 is at the second logic voltage level and the second control signal S2 is at the second logic voltage level, which are presented as logical expressions (0, 0), as shown in the time interval from time point T5 to the time point T6. It is noted that the time interval from time point T2 to time point T3 is bypassed when sampling due to error-proof or accuracy considerations, and a same operation is for the time interval from time point T4 to time point T5. In addition, according to diagnostic signal Vd, the control unit 13 confirms each kind of logical expressions formed by further comparing the first control signal S1 and the second control signal S2 during the diagnosis period Preferably but not exclusively, a second NOR operation based on the first control signal S1 and the second control signal S2 is performed to output a result as a reference signal. If the diagnostic signal Vd, which is outputted from the first NOR operation of the first driving signal Sa and the second driving signal Sb by the NOR gate circuit 160, meets a result of the second NOR operation of the first control signal S1 and the second control signal S2 by the control unit 13 in the corresponding logical expressions, the control unit 13 diagnoses that the first STO module 14 and the second STO module 15 are all operated normally. As shown in FIG. 2, since the control unit 13 confirms four kinds of logical expressions formed by comparing the first control signal S1 and the second control signal S2 with the diagnostic signal Vd, in the time interval from time point T5 to the time point T6, the logical expression of the diagnostic signal Vd outputted from the first NOR operation of the first driving signal Sa and the second driving signal Sb by the NOR gate circuit 160 meets the result of the second NOR operation of the first control signal S1 and the second control signal S2 by the control unit 13 in the corresponding logical expressions. Consequently, the control unit 13 diagnoses that the first STO module 14 and the second STO module 15 are all operated normally. On the contrary, each kind of logical expressions formed by comparing the first control signal S1 and the second control signal S2 during the diagnosis period is confirmed. If the diagnostic signal Vd, outputted from the first NOR operation of the first driving signal Sa and the second driving signal Sb by the NOR gate circuit 160, doesn't meet the result of the second NOR operation of the first control signal S1 and the second control signal S2 by the control unit 13 in the corresponding logical expressions, the control unit 13 diagnoses and determines that at least one of the first STO module 14 and the second STO module 15 is malfunctioned. In other embodiments, when the control unit 13 diagnoses that at least one of the first STO module 14 and the second STO module 15 is malfunctioned, a warning signal is outputted from the control unit 13, so that an upper computer (not shown) controlling the overall operation of the motor drive system 1 can take the corresponding protective measures or process according to the warning signal.

Certainly, the timing diagram of the first control signal S1 and the second control signal S2 shown in FIG. 2 is only an example. The present disclosure is not limited thereto.

Namely, the first control signal S1 and the second control signal S2 are mutually related, and the sequence of the four kinds of logical expressions generated can be arbitrarily set, as long as the first control signal S1 and the second control signal S2 are cooperated with each other to generate four different kinds of logical expressions during the diagnosis period.

As can be seen from the above descriptions, since the motor drive system 1 of the present disclosure includes the first STO module 14 and the second STO module 15. The first STO module 14 is used to drive the first gate driving circuit 11 and the high-voltage side switch 100, and the second STO module 15 is used to drive the second gate driving circuit 12 and the low-voltage side switch 101. Consequently, the first STO module 14 and the second STO module 15 are used to achieve a two-channel STO redundancy infrastructure. Thus, the safety of the motor drive system 1 is improved. In addition, the motor drive system 1 of the present disclosure further includes the diagnosis module 16 having a function of actively diagnosing malfunction of the two STO modules before the motor 9 is operated. The diagnosis module 16 performs the active diagnosis in advance to determine whether any of the first STO module 14 and the second STO module 15 is malfunctioned due to abnormal circuit components. Thus, when any of the STO modules is malfunctioned, the necessary protective measures or process, such as making the motor drive system 1 inoperative, are taken. The safety of the motor drive system 1 is further improved.

In some embodiments, the diagnosis module 16 further includes a microcontroller 164. The microcontroller 164 is electrically connected to the first gate driving circuit 11 and the second gate driving circuit 12. The microcontroller 164 is configured to selectively output the first pulse width modulation signal to the first gate driving circuit 11, or output the second pulse width modulation signal to the second gate driving circuit 12. In addition, the diagnosis module 16 further includes a NOT gate circuit 165. The NOT gate circuit 165 is electrically connected to the output terminal of the NOR gate circuit 160 and the microcontroller 164. Moreover, the NOT gate circuit 165 is electrically connected to an output terminal of the first voltage-dividing circuit 161 and an output terminal of the second voltage-dividing circuit 162. The NOT gate circuit 165 performs a NOT operation according to an output of the NOR gate circuit 160 to output a first comparison signal Vc1 to the microcontroller 164, performs a NOT operation according to an output of the first voltage-dividing circuit 161 to output a second comparison signal Vc2 to the microcontroller 164, and performs a NOT operation according to an output of the second voltage-dividing circuit 162 to output a third comparison signal Vc3 to the microcontroller 164. Moreover, the microcontroller 164 determines whether the first driving signal Sa and the second driving signal Sb are identical, i.e., at same voltage level, by comparing the second comparison signal Vc2 and the third comparison signal Vc3, and further determines whether the diagnostic signal Vd is equal to a result of the NOR operation of the first driving signal Sa and the second driving signal Sb by comparing the first comparison signal Vc1, the second comparison signal Vc2 and the third comparison signal Vc3. According to the comparison results, it determines whether the first pulse width modulation signal is outputted to the first gate driving circuit 11, and whether the second pulse width modulation signal is outputted to the second gate driving circuit 12. When the microcontroller 164 determines that the first driving signal Sa and the second driving signal Sb are identical, and that the diagnostic signal Vd is equal to the result of the NOR operation of the first driving signal Sa and the second driving signal Sb, which means that the first STO module 14 and the second STO module 15 are both operated normally, the microcontroller 164 outputs the first pulse width modulation signal to the first gate driving circuit 11, and outputs the second pulse width modulation signal to the second gate driving circuit 12. On the contrary, when the microcontroller 164 determines that the first driving signal Sa and the second driving signal Sb are distinct, said not identical, i.e., not at the same voltage level, or the result of the NOR operation of the first comparison signal Vc1 is not equal to that of the second comparison signal Vc2 and the third comparison signal Vc3, which means that at least one of the first STO module 14 and the second STO module 15 is malfunctioned, the microcontroller 164 stops outputting the first pulse width modulation signal to the first gate driving circuit 11, and stops outputting the second pulse width modulation signal to the second gate driving circuit 12. As a result, even if the first gate driving circuit 11 and the second gate driving circuit 12 are actuated respectively, the high-voltage side switch 100 and the low-voltage side switch 101 cannot be driven to operate. With the cooperation of the microcontroller 164 and the NOT gate circuit 165, the microcontroller 164 can passively diagnose whether any of the first STO module 14 and the second STO module 15 is malfunctioned due to abnormal circuit components, so as to take necessary protective measures or process when any faulty problem occurs in any of the STO modules. Thus, the safety of the motor drive system 1 is further improved.

Figure 3:
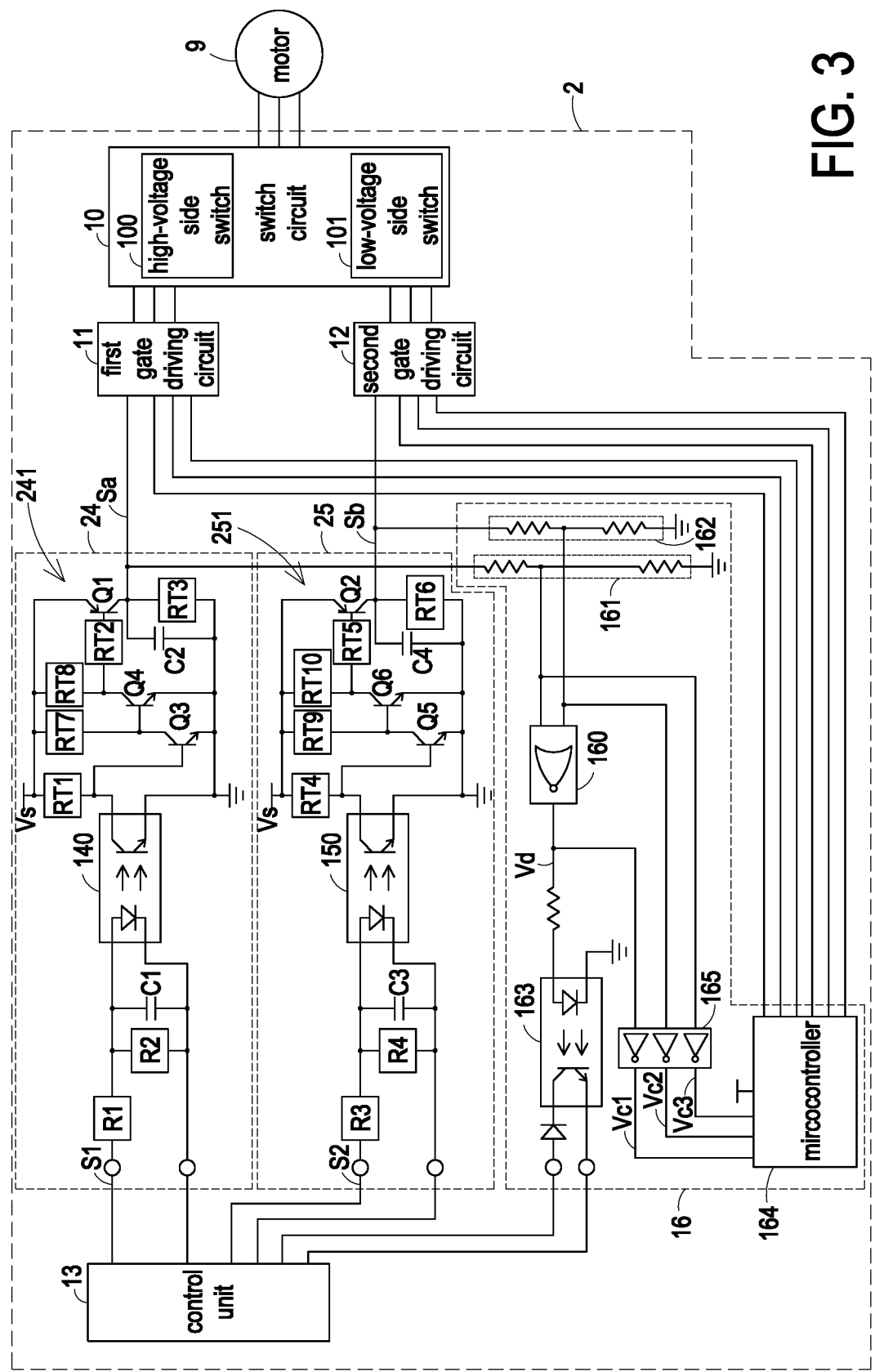
FIG. 3 is a circuit diagram illustrating a motor drive system according to a second embodiment of the present disclosure.

FIG. 3 is a circuit diagram illustrating a motor drive system according to a second embodiment of the present disclosure. As shown in FIG. 3, in the embodiment, the circuit topology of the motor drive system 2 is similar to that of the motor drive system 1 in FIG. 1. The circuit structure and the actions indicated by the numerals similar to those of the first embodiment mean similar the circuit structure and the actions, and are not redundantly described herein. In the embodiment, the circuit structure of the first conversion circuit 241 of the first STO module 24 of the motor drive system 2 is further modified by that of the first conversion circuit 141 of the first STO module 14 of the motor drive system 1 shown in FIG. 1. Similarly, the circuit structure of the second conversion circuit 251 of the second STO module 25 of the motor drive system 2 is further modified by that of the second conversion circuit 151 of the second STO module 15 of the motor drive system 1 shown in FIG. 1. With the modification of the circuit structure, the safety and reliability of the motor drive system 2 are further improved.

In the embodiment, the first STO module 24 is modified by the first STO module 14 shown in FIG. 1. Compared with the first conversion circuit 141 shown in FIG. 1, the first conversion circuit 241 here further comprises a seventh regulating resistor RT7, an eighth regulating resistor RT8, a first NPN bipolar transistor Q3 and a second NPN bipolar transistor Q4. The seventh regulating resistor RT7 includes a first terminal and a second terminal, and the first terminal of the seventh regulating resistor RT7 is electrically connected to the voltage source Vs. The first NPN bipolar transistor Q3 includes a base electrode, an emitter electrode and a collector electrode. The base electrode of the first NPN bipolar transistor Q3 is electrically connected between the first terminal of the first regulating resistor RT1 and the output terminal of the first optical coupler 140 of the first coupling module, the emitter electrode of the first NPN bipolar transistor Q3 is electrically connected to a ground terminal, and the collector electrode of the first NPN bipolar transistor Q3 is electrically connected to the second terminal of the seventh regulating resistor RT7. The eighth regulating resistor RT8 includes a first terminal and a second terminal, and the first terminal of the eighth regulating resistor RT8 is electrically connected to the voltage source Vs. The second NPN bipolar transistor Q4 includes a base electrode, an emitter electrode and a collector electrode. The base electrode of the second NPN bipolar transistor Q4 is electrically connected between the second terminal of the seventh regulating resistor RT7 and the collector electrode of the first NPN bipolar transistor Q3, the emitter electrode of the second NPN bipolar transistor Q4 is electrically connected to the ground terminal, and the collector electrode of the second NPN bipolar transistor Q4 is electrically connected to the second terminal of the eighth regulating resistor RT8. The second regulating resistor RT2 includes a first terminal and a second terminal, and the first terminal of the second regulating resistor RT2 is electrically connected between the second terminal of the eighth regulating resistor RT8 and the collector electrode of the second NPN bipolar transistor Q4. The first PNP bipolar transistor Q1 includes a base electrode, an emitter electrode and a collector electrode. The base electrode of the first PNP bipolar transistor Q1 is electrically connected to the second terminal of the second regulating resistor RT2, the emitter electrode of the first PNP bipolar transistor Q1 is electrically connected to the voltage source Vs, and the collector electrode of the first PNP bipolar transistor Q1 is electrically connected to the first gate driving circuit 11.

In the embodiment, the second STO module 25 is modified by the second STO module 15 shown in FIG. 1. Compared with the second conversion circuit 151 shown in FIG. 1, the second conversion circuit 251 here further comprises a ninth regulating resistor RT9, a tenth regulating resistor RT10, a third NPN bipolar transistor Q5 and a fourth NPN bipolar transistor Q6. The ninth regulating resistor RT9 includes a first terminal and a second terminal, and the first terminal of the ninth regulating resistor RT9 is electrically connected to the voltage source Vs. The third NPN bipolar transistor Q5 includes a base electrode, an emitter electrode and a collector electrode. The base electrode of the third NPN bipolar transistor Q5 is electrically connected between the first terminal of the fourth regulating resistor RT4 and the output terminal of the first optical coupler 150, the emitter electrode of the third NPN bipolar transistor Q5 is electrically connected to the ground terminal, and the collector electrode of the third NPN bipolar transistor Q5 is electrically connected to the second terminal of the ninth regulating resistor RT9. The tenth regulating resistor RT10 includes a first terminal and a second terminal, and the first terminal of the tenth regulating resistor RT10 is electrically connected to the voltage source Vs. The fourth NPN bipolar transistor Q6 includes a base electrode, an emitter electrode and a collector electrode. The base electrode of the fourth NPN bipolar transistor Q6 is electrically connected between the second terminal of the ninth regulating resistor RT9 and the collector electrode of the third NPN bipolar transistor Q5, the emitter electrode of the fourth NPN bipolar transistor Q6 is electrically connected to the ground terminal, and the collector electrode of the fourth NPN bipolar transistor Q6 is electrically connected to the second terminal of the tenth regulating resistor RT10. The fifth regulating resistor RT5 includes a first terminal and a second terminal, the first terminal of the fifth regulating resistor RT5 is electrically connected between the second terminal of the tenth regulating resistor RT10 and the collector electrode of the fourth NPN bipolar transistor Q6. The second PNP bipolar transistor Q2 includes a base electrode, an emitter electrode and a collector electrode. The base electrode of the second PNP bipolar transistor Q2 is electrically connected to the second terminal of the fifth regulating resistor RT5, the emitter electrode of the second PNP bipolar transistor Q2 is electrically connected to the voltage source Vs, and the collector electrode of the second PNP bipolar transistor Q2 is electrically connected to the second gate driving circuit 12. With more bipolar transistors in first conversion circuit 241 and the second conversion circuit 251, signals will be amplified, and the measuring accuracy will be improved.

Figure 4:
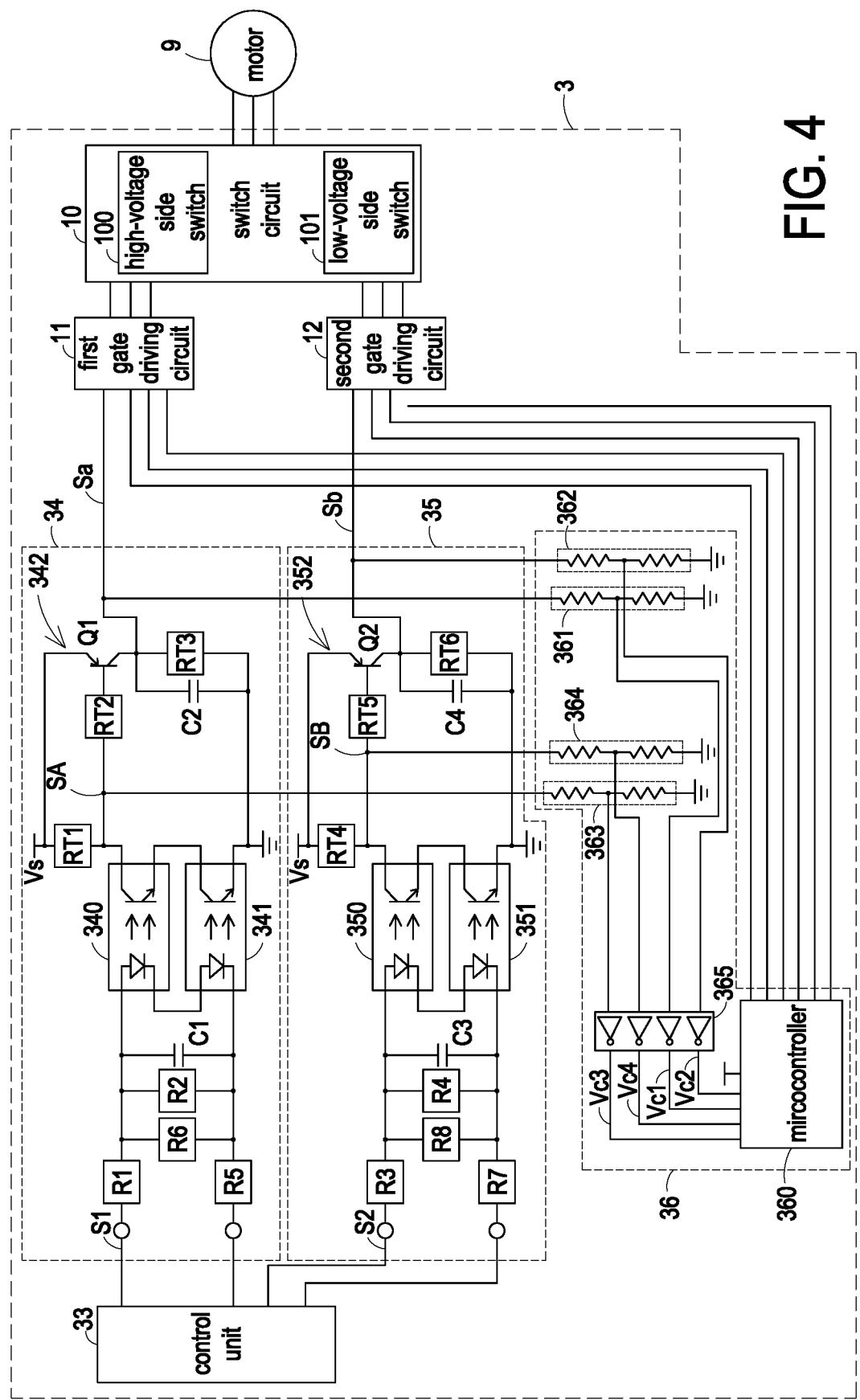
FIG. 4 is a circuit diagram illustrating a motor drive system according to a third embodiment of the present disclosure.

FIG. 4 is a circuit diagram illustrating a motor drive system according to a third embodiment of the present disclosure. As shown in FIG. 4, in the embodiment, the motor drive system 3 is electrically connected to the motor 9, and drives the motor 9 to operate. Preferably but not exclusively, the motor drive system 3 is applied to an elevator equipment, and the motor 9 is used to move the elevator of the elevator equipment. The motor drive system 3 includes a switch circuit 10, a first gate driving circuit 11, a second gate driving circuit 12, a control unit 33, a first STO module 34 includes a first coupling module, a second STO module 35 includes a second coupling module and a diagnosis module 36. In the embodiment, the structures, elements and functions of the switch circuit 10, the first gate driving circuit 11 and the second gate driving circuit 12 are similar to those of the switch circuit 10, the first gate driving circuit 11 and the second gate driving circuit 12 in FIG. 1. The elements and features indicated by the numerals similar to those of the first embodiment mean similar elements and features, and are not redundantly described herein.

In the embodiment, the control unit 33 is configured to output the first control signal S1 and the second control signal S2. When the motor drive system 3 is kept in a normal operating state, the control unit 33 outputs the first control signal S1 and the second control signal S2, respectively, which are both at a first logic voltage level, thereby allowing the motor 9 to operate. On the contrary, when the motor drive system 3 is operated in an emergency state, for example, when the motor 9 needs to stop operation immediately due to safety protection measures or process, the control unit 33 outputs the first control signal S1 and the second control signal S2, respectively, which are both at a second logic voltage level, thereby allowing the motor 9 to stop working. In some embodiments, the control unit 33 further includes, for example but not limited to, a safety sensor (not shown). When the safety sensor detects that the motor driving system 3 is in a normal operating state, the control unit 33 respectively outputs the first control signal S1 and the second control signal S2 both at the first logic voltage level in accordance with the sensing result of the safety sensor. On the contrary, when the safety sensor detects that the motor drive system 3 is in an emergency state, the control unit 33 respectively outputs the first control signal S1 and the second control signal S2 both at the second logic voltage level in accordance with the sensing result of the safety sensor. Preferably but not exclusively, the first control signal S1 and the second control signal S2 are the same signal, i.e., at the same voltage level.

In the embodiment, the first STO module 34 is electrically connected between the control unit 33 and the first gate driving circuit 11, and configured to control the actuation of the first gate driving circuit 11. When the first STO module 34 receives the first control signal S1 at the first logic voltage level from the control unit 33, a first inner signal SA is generated from the first STO module 34 according to the first control signal S1, and then a first driving signal Sa is outputted according to the first inner signal SA from an output terminal of the first STO module 34 for actuating the first gate driving circuit 11. It makes the first gate driving circuit 11 to drive the high-voltage side switch 100 to operate according to the first pulse width modulation signal. When the first STO module 34 receives the first control signal S1 at the second logic voltage level from the control unit 33, the first inner signal SA is generated from the first STO module 34 according to the first control signal S1, and then the first driving signal Sa is outputted according to the first inner signal SA from the output terminal of the first STO module 34 to deactivate the first gate driving circuit 11. It makes the high-voltage side switch 100 non-operated.

In the embodiment, the second STO module 35 is electrically connected between the control unit 33 and the second gate driving circuit 12, and configured to control the actuation of the second gate driving circuit 12. When the second STO module 35 receives the second control signal S2 at the first logic voltage level from the control unit 33, a second inner signal SB is generated from the second STO module 35, and then a second driving signal Sb is outputted from an output terminal of the second STO module 35 for actuating the second gate driving circuit 12. It makes the second gate driving circuit 12 to drive the low-voltage side switch 101 to operate according to the second pulse width modulation signal. When the second STO module 35 receives the second control signal S2 at the second logic voltage level from the control unit 33, the second inner signal SB is generated from the second STO module 35, and the second driving signal Sb is outputted from the output terminal of the second STO module 35 to deactivate the second gate driving circuit 12. It makes the low-voltage side switch 101 non-operated.

In some embodiments, while the first STO module 34 is operated normally, the first internal signal SA and the first driving signal Sa are reversed to each other. While the second STO module 35 is operated normally, the second internal signal SB and the second driving signal Sb are reversed to each other. The present disclosure is not limited thereto.

In the embodiment, the diagnosis module 36 is electrically connected to the inner terminal and the output terminal of the first STO module 34, and configured to capture the first inner signal SA and the first driving signal Sa, respectively. Moreover, the diagnosis module 36 is electrically connected to the inner terminal and the output terminal of the second STO module 35, and configured to capture the second inner signal SB and the second driving signal Sb, respectively. In the embodiment, the diagnosis module 36 further includes a microcontroller 360. The microcontroller 360 respectively determines whether the first inner signal SA and the second inner signal SB are identical, whether the first driving signal Sa and the second driving signal Sb are identical, whether the first inner signal SA and the first driving signal Sa are reversed, and whether the second inner signal SB and the second driving signal Sb are reversed. Accordingly, the microcontroller 360 further diagnoses conditions above-described and determines whether any of the first STO module 34 and the second STO module 35 is malfunctioned when the first inner signal SA and the second inner signal SB are reversed, the first driving signal Sa and the second driving signal Sb are reversed, the first inner signal SA and the first driving signal Sa are identical, or the second inner signal SB and the second driving signal Sb are identical.

In some embodiments, the diagnosis module 36 selectively outputs the first pulse width modulation signal to the first gate driving circuit 11, or outputs the second pulse width modulation signal to the second gate driving circuit 12. Therefore, when the first gate driving circuit 11 is actuated and receives the first pulse width modulation signal, the first gate driving circuit 11 correspondingly drives the high-voltage side switch 100 to turn on and turn off according to the first pulse width modulation signal. Similarly, when the second gate driving circuit 12 is actuated and receives the second pulse width modulation signal, the second gate driving circuit 12 correspondingly drives the low-voltage side switch 101 to turn on and turn off according to the second pulse width modulation signal.

In the embodiment, the first STO module 34 is modified by the first STO module 14 shown in FIG. 1, and further includes a fifth current-limiting resistor R5, a sixth current-limiting resistor R6 and a second optical coupler 341 of the first coupling module. The fifth current-limiting resistor R5 includes a first terminal and a second terminal, the first terminal of the fifth current-limiting resistor R5 is electrically connected the control unit 33. The sixth current-limiting resistor R6 is connected in series between the second terminal of the first current-limiting resistor R1 and the second terminal of the fifth current-limiting resistor R5. The second optical coupler 341 of the first coupling module includes an input terminal and an output terminal. The input terminal of the first optical coupler 340 of the first coupling module and the input terminal of the second optical coupler 341 of the first coupling module are connected between the second terminal of the first current-limiting resistor R1 and the second terminal of the fifth current-limiting coupler R5 in series. The output terminal of the first optical coupler 340 of the first coupling module and the output terminal of the second optical coupler 341 of the first coupling module are connected between a ground terminal and a voltage source Vs in series. Moreover, the first inner signal SA is formed by a voltage of the output terminal of the first optical coupler 340 of the first coupling module. The first conversion circuit 342 is electrically connected to the output terminal of the first optical coupler 340 of the first coupling module, the output terminal of the second optical coupler 341 of the first coupling module and the first gate driving circuit 11, and configured to output the first driving signal Sa according to the first control signal S1. In the embodiment, the first conversion circuit 342 includes a first regulating resistor RT1, a second regulating resistor RT2, a third regulating resistor RT3, a first PNP bipolar transistor Q1 and a first voltage-stabilizing capacitor C2. The first regulating resistor RT1 includes a first terminal and a second terminal, the first terminal of the first regulating resistor RT1 is electrically connected to the output terminal of the first optical coupler 340 of the first coupling module, and the second terminal of the first regulating resistor RT1 is electrically connected to the voltage source Vs. The second regulating resistor RT2 includes a first terminal and a second terminal, the first terminal of the second regulating resistor RT2 is electrically connected between the first terminal of the first regulating resistor RT1 and the output terminal of the first optical coupler 340 of the first coupling module. The first PNP bipolar transistor Q1 includes a base electrode, an emitter electrode and a collector electrode. The base electrode of the first PNP bipolar transistor Q1 is electrically connected to the second terminal of the second regulating resistor RT2, the emitter electrode of the first PNP bipolar transistor Q1 is electrically connected to the voltage source Vs, and the collector electrode of the first PNP bipolar transistor Q1 is electrically connected to the first gate driving circuit 11. The first driving signal Sa is formed by a voltage on the collector electrode of the first PNP bipolar transistor Q1. The first voltage-stabilizing capacitor C2 is electrically connected between the collector electrode of the first PNP bipolar transistor Q1 and the ground terminal. The third regulating resistor RT3 is electrically connected between the collector electrode of the first PNP bipolar transistor Q1 and the ground terminal.

In the embodiment, the second STO module 35 is modified by the second STO module 15 shown in FIG. 1, and further includes a seventh current-limiting resistor R7, an eighth current-limiting resistor R8 and a second optical coupler 351 of the second coupling module. The seventh current-limiting resistor R7 includes a first terminal and a second terminal, and the first terminal of the seventh current-limiting resistor R7 is electrically connected to the control unit 33. The eighth current-limiting resistor R8 is electrically connected in series between the second terminal of the third current-limiting resistor R3 and the second terminal of the seventh current-limiting resistor R7. The fourth current-limiting resistor R4 is electrically connected in series between the second terminal of the third current-limiting resistor R3 and the second terminal of the seventh current-limiting resistor R7, and connected to the eighth current-limiting resistor R8 in parallel. The second optical coupler 351 of the second coupling module includes an input terminal and an output terminal. The input terminal of the first optical coupler 350 of the second coupling module and the input terminal of the second optical coupler 351 of the second coupling module are electrically connected in series between the second terminal of the third current-limiting resistor R3 and the second terminal of the seventh current-limiting resistor R7. The output terminal of the first optical coupler 350 of the second coupling module and the output terminal of the second optical coupler 351 of the second coupling module are electrically connected in series between a ground terminal and the voltage source Vs. Preferably but not exclusively, the second inner signal SB is formed by a voltage on the output terminal of the first optical coupler 350 of the second coupling module. The second conversion circuit 352 is electrically connected to the output terminal of the first optical coupler 350 of the second coupling module, the output terminal of the second optical coupler 351 of the second coupling module and the second gate driving circuit 12, and configured to output the second driving signal Sb according to the second control signal S2. In the embodiment, the second conversion circuit 352 includes a fourth regulating resistor RT4, a fifth regulating resistor RT5, a sixth regulating resistor RT6, a second PNP bipolar transistor Q2 and a second voltage-stabilizing capacitor C4. The fourth regulating resistor RT4 includes a first terminal and a second terminal, the first terminal of the fourth regulating resistor RT4 is electrically connected to the output terminal of the first optical coupler 350 of the second coupling module, and the second terminal of the fourth regulating resistor RT4 is electrically connected to the voltage source Vs. The fifth regulating resistor RT5 includes a first terminal and a second terminal, and the first terminal of the fifth regulating resistor RT5 is electrically connected between the first terminal of the fourth regulating resistor RT4 and the output terminal of the first optical coupler 350 of the second coupling module. The second PNP bipolar transistor Q2 includes a base electrode, an emitter electrode and a collector electrode. The base electrode of the second PNP bipolar transistor Q2 is electrically connected to the second terminal of the fifth regulating resistor RT5, the emitter electrode of the second PNP bipolar transistor Q2 is electrically connected to the voltage source Vs, and the collector electrode of the second PNP bipolar transistor Q2 is electrically connected to the second gate driving circuit 12. Moreover, the second driving signal Sb is formed by a voltage on the collector electrode of the second PNP bipolar transistor Q2. The second voltage-stabilizing capacitor C4 is electrically connected between the collector electrode of the second PNP bipolar transistor Q2 and the ground terminal. The sixth regulating resistor RT6 is electrically connected between the collector electrode of the second PNP bipolar transistor Q2 and the ground terminal.

Compared with the motor drive system 1 shown in FIG. 1, which has the first STO module 14 with only two current-limiting resistors (R1, R2) and one optical coupler (140), and has the second STO module 15 with only two current-limiting resistors (R3, R4) and one optical coupler (150), since the first STO module 34 of the motor drive system 3 in the embodiment has four current-limiting resistors (R1, R2, R5, R6) and two optical couplers (340, 341), and the second STO module 35 of the motor drive system 3 in the embodiment has four current-limiting resistors (R3, R4, R7, R8) and two optical couplers (350, 351) shown in FIG. 4, it facilitates the first STO module 34 and the second STO module 35 to enhance the fault tolerance of the internal circuit components. The safety of the motor drive system 3 is improved.

In some embodiments, the diagnosis module 36 further includes a first voltage-dividing circuit 361, a second voltage-dividing circuit 362, a third voltage-dividing circuit 363 and a fourth voltage-dividing circuit 364. The first voltage-dividing circuit 361 is electrically connected to the output terminal of the first STO module 34, and includes two voltage-dividing resistors connected in series. When the first driving signal Sa is outputted by the first STO module 34, the first voltage-dividing circuit 361 divides the first driving signal Sa. The second voltage-dividing circuit 362 is electrically connected to the output terminal of the second STO module 35, and includes two voltage-dividing resistors connected in series. When the second driving signal Sb is outputted by the second STO module 35, the second voltage-dividing circuit 362 divides the second driving signal Sb. The third voltage-dividing circuit 363 is electrically connected to the output terminal of the first optical coupler 340 of the first coupling module of the first STO module 34, and includes two voltage-dividing resistors connected in series. The third voltage-dividing circuit 363 is configured to divide the first inner signal SA on the output terminal of the first optical coupler 340 of the first coupling module. The fourth voltage-dividing circuit 364 is electrically connected to the output terminal of the first optical coupler 350 of the second coupling module of the second STO module 35, and includes two voltage-dividing resistors connected in series. The fourth voltage-dividing circuit 364 is configured to divide the second inner signal SB on the output terminal of the first optical coupler 350 of the second coupling module.

In addition, the diagnosis module 36 further includes a NOT gate circuit 365. The NOT gate circuit 365 is electrically connected to the microcontroller 360, and electrically connected to the output terminal of the first voltage-dividing circuit 361, the output terminal of the second voltage-dividing circuit 362, the output terminal of the third voltage-dividing circuit 363 and the output terminal of the fourth voltage-dividing circuit 364. In the embodiment, the NOT gate circuit 365 performs a NOT operation according to an output of the first voltage-dividing circuit 361 to output a first comparison signal Vc1 to the microcontroller 360, performs a NOT operation according to an output of the second voltage-dividing circuit 362 to output a second comparison signal Vc2 to the microcontroller 360, performs a NOT operation according to an output of the third voltage-dividing circuit 363 to output a third comparison signal Vc3 to the microcontroller 360, and performs a NOT operation according to an output of the fourth voltage-dividing circuit 364 to output a fourth comparison signal Vc4 to the microcontroller 360. Furthermore, the microcontroller 360 determines whether the first driving signal Sa and the second driving signal Sb are identical by comparing the first comparison signal Vc1 and the second comparison signal Vc2, determines whether the first inner signal SA and the second inner signal SB are identical by comparing the third comparison signal Vc3 and the fourth comparison signal Vc4, determines whether the first inner signal SA and the first driving signal Sa are reversed by comparing the first comparison signal Vc1 and the third comparison signal Vc3, and determines whether the second inner signal SB and the second driving signal Sb are reversed by comparing the second comparison signal Vc2 and the fourth comparison signal Vc4. According to the comparison results, the microcontroller 360 determines whether the first pulse width modulation signal is outputted to the first gate driving circuit 11, and whether the second pulse width modulation signal is outputted to the second gate driving circuit 12. When the microcontroller 360 determines that the first inner signal SA and the second inner signal SB are identical, the first driving signal Sa and the second driving signal Sb are identical, the first inner signal SA and the first driving signal Sa are reversed, or the second inner signal SB and the second driving signal Sb are reversed, the microcontroller 360 determines that both of the first STO module 34 and the second STO module 35 are normal, and then outputs the first pulse width modulation signal to the first gate driving circuit 11, and outputs the second pulse width modulation signal to the second gate driving circuit 12. On the contrary, when the microcontroller 360 determines that the first inner signal SA and the second inner signal SB are distinct, said reversed, the first driving signal Sa and the second driving signal Sb are distinct, said reversed, the first inner signal SA and the first driving signal Sa are non-reversed, said identical, or the second inner signal SB and the second driving signal Sb are non-reversed, said identical, the microcontroller 360 determines that at least one of the first STO module 34 and the second STO module 35 is malfunctioned, and then stops outputting the first pulse width modulation signal to the first gate driving circuit 11, and stops outputting the second pulse width modulation signal to the second gate driving circuit 12. It is noted that the microcontroller 360 determines that the first STO module 34 is malfunctioned when the first inner signal SA and the first driving signal Sa are identical, and determines that the second STO module 35 is malfunctioned when the second inner signal SB and the second driving signal Sb are identical. As a result, even if the first gate driving circuit 11 and the second gate driving circuit 12 are actuated respectively, the high-voltage side switch 100 and the low-voltage side switch 101 cannot be driven to operate. With the cooperation of the microcontroller 360 and the NOT gate circuit 365, the microcontroller 360 can passively diagnose whether any of the first STO module 34 and the second STO module 35 is malfunctioned due to abnormal circuit components, so as to take necessary protective measures or process when any faulty problem occurs in any of the STO modules. Thus, the safety of the motor drive system 3 is further improved.

Figure 5:
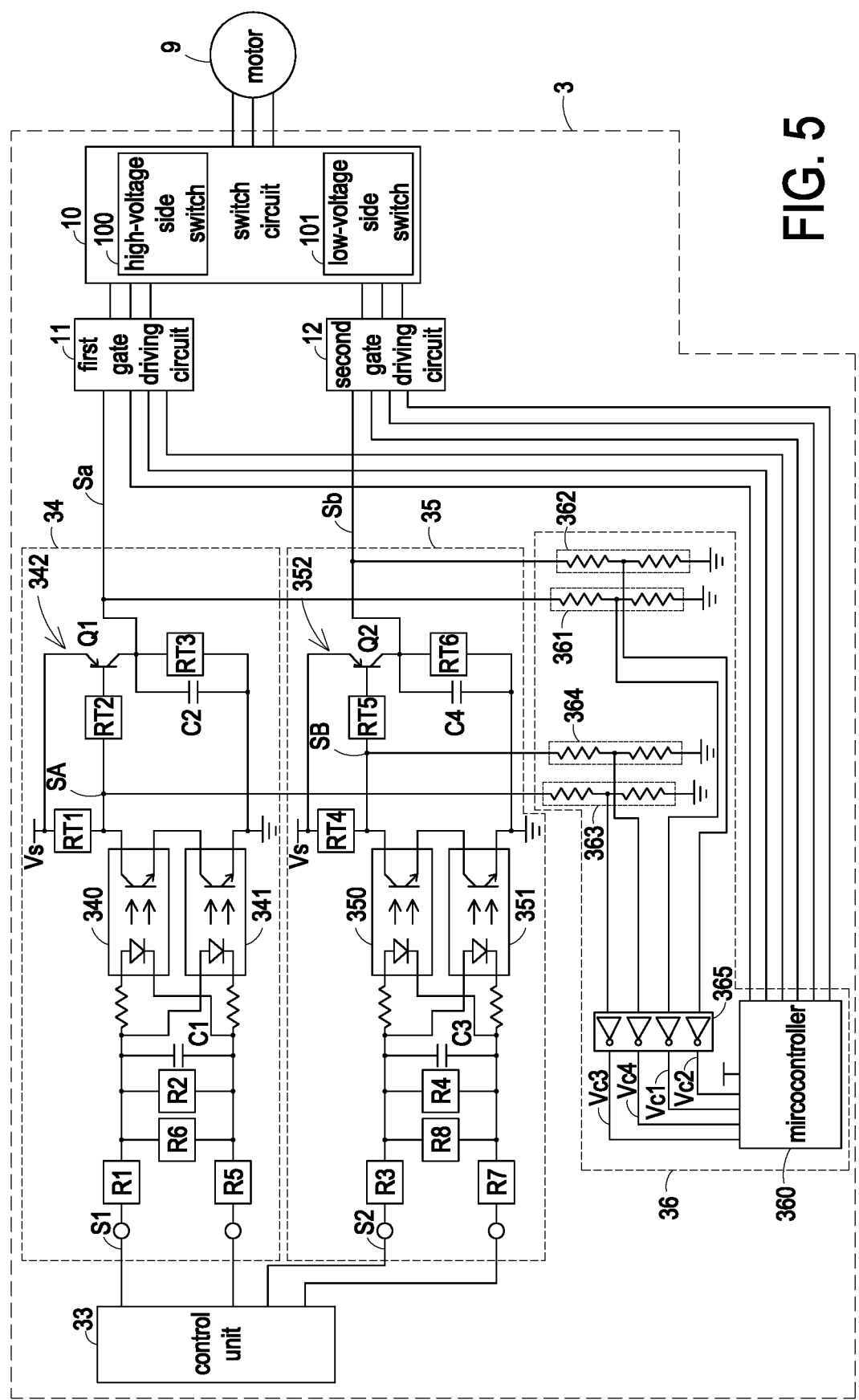
FIG. 5 is a circuit diagram illustrating a motor drive system according to a fourth embodiment of the present disclosure.

FIG. 5 is a circuit diagram illustrating a motor drive system according to a fourth embodiment of the present disclosure. In the embodiment shown in FIG. 4, the first STO module 34 has the input terminal of the first optical coupler 340 of the first coupling module and the input terminal of the second optical coupler 341 of the first coupling module which are connected in series, and the second STO module 35 has the input terminal of the first optical coupler 350 of the second coupling module and the input terminal of the second optical coupler 351 of the second coupling module which are connected in series. Different from the embodiment shown in FIG. 4, in some embodiments as shown in FIG. 5, the first STO module 34 has the input terminal of the first optical coupler 340 of the first coupling module and the input terminal of the second optical coupler 341 of the first coupling module which are connected in parallel, and the second STO module 35 has the input terminal of the first optical coupler 350 of the second coupling module and the input terminal of the second optical coupler 351 of the second coupling module which are connected in parallel. The present disclosure is not limited thereto.

Figure 6:
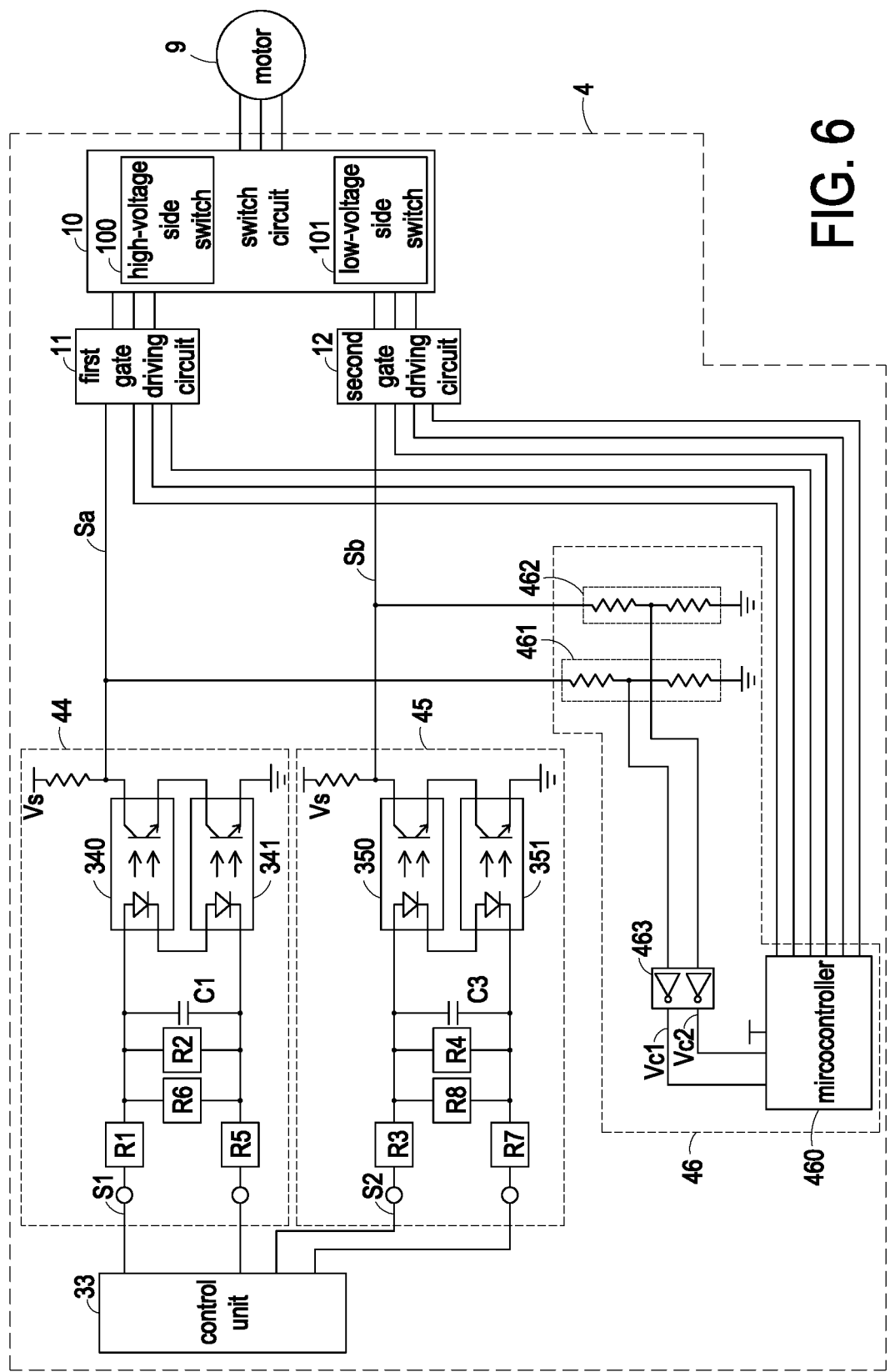
FIG. 6 is a circuit diagram illustrating a motor drive system according to a fifth embodiment of the present disclosure.

FIG. 6 is a circuit diagram illustrating a motor drive system according to a fifth embodiment of the present disclosure. As shown in FIG. 6, in the embodiment, the circuit topology of the motor drive system 4 is similar to that of the motor drive system 3 in FIG. 4. The circuit structure and the actions indicated by the numerals similar to those of the third embodiment mean the circuit structure and the actions, and are not redundantly described herein. Compared with the first STO module 34 and the second STO module 35 of the motor drive system 3 shown in FIG. 4, the first STO module 44 of the motor drive system 4 in the embodiment omits the first conversion circuit 342 shown in FIG. 4, and the output terminal of the first optical coupler 340 of the first coupling module of the first STO module 44 is electrically connected to the first gate driving circuit 11. Therefore, the first driving signal Sa is formed by the voltage on the output terminal of the first optical coupler 340 of the first coupling module of the first STO module 44. In addition, the second STO module 45 of the motor drive system 4 in the embodiment omits the second conversion circuit 352 shown in FIG. 4, and the output terminal of the first optical coupler 350 of the second coupling module of the second STO module 45 is electrically connected to the second gate driving circuit 12. Moreover, the second driving signal Sb is formed by the voltage on the output terminal of the first optical coupler 350 of the second coupling module of the second STO module 45.

Moreover, compared to the diagnosis module 36 shown in FIG. 4, the diagnosis module 46 of the motor drive system 4 in the embodiment is electrically connected to the output terminal of the first STO module 44 to capture the first driving signal Sa. Moreover, the diagnosis module 46 is also electrically connected to the output terminal of the second STO module 45 to capture the second driving signal Sb. In the embodiment, the diagnosis module 46 further includes a microcontroller 460. The microcontroller 460 determines whether the first driving signal Sa and the second driving signal Sb are identical, and diagnoses whether any of the first STO module 44 and the second STO module 45 is malfunctioned according to the comparison result. That is, the microcontroller 460 determines at least one of the first STO module 44 and the second STO module 45 is malfunctioned when the first driving signal Sa and the second driving signal Sb are distinct or reversed.

In some embodiments, the diagnosis module 46 further includes a first voltage-dividing circuit 461 and a second voltage-dividing circuit 462. The first voltage-dividing circuit 461 is electrically connected to the output terminal of the first STO module 44, and includes two voltage-dividing resistors connected in series. When the first STO module 44 outputs the first driving signal Sa, the first voltage-dividing circuit 461 divides the first driving signal Sa. The second voltage-dividing circuit 462 is electrically connected to the output terminal of the second STO module 45, and includes two voltage-dividing resistors connected in series. When the second STO module 45 outputs the second driving signal Sb, the second voltage-dividing circuit 462 divides the second driving signal Sb.

In addition, the diagnosis module 46 further includes a NOT gate circuit 463. The NOT gate circuit 463 is electrically connected to the microcontroller 460, and electrically connected to the output terminal of the first voltage-dividing circuit 461 and the output terminal of the second voltage-dividing circuit 462. In the embodiment, the NOT gate circuit 463 performs a NOT operation according to an output of the first voltage-dividing circuit 461 to output a first comparison signal Vc1 to the microcontroller 460, and performs a NOT operation according to an output of the second voltage-dividing circuit 462 to output a second comparison signal Vc2 to the microcontroller 460. Moreover, the microcontroller 460 determines whether the first driving signal Sa and the second driving signal Sb are identical by comparing the first comparison signal Vc1 and the second comparison signal Vc2. The microcontroller 460 further determines whether the first pulse width modulation signal is outputted to the first gate driving circuit 11 in accordance with the comparison result, and determines whether the second pulse width modulation signal is outputted to the second gate driving circuit 12 in accordance with the comparison result. When the microcontroller 460 determines that the first driving signal Sa and the second driving signal Sb are identical, the microcontroller 460 outputs the first pulse width modulation signal to the first gate driving circuit 11, and outputs the second pulse width modulation signal to the second gate driving circuit 12. On the contrary, when the microcontroller 460 determines that the first driving signal Sa and the second driving signal Sb are distinct, said reversed, the microcontroller 460 stops outputting the first pulse width modulation signal to the first gate driving circuit 11, and stops outputting the second pulse width modulation signal to the second gate driving circuit 12. As a result, even if the first gate driving circuit 11 and the second gate driving circuit 12 are actuated respectively, the high-voltage side switch 100 and the low-voltage side switch 101 cannot be driven to operate. With the cooperation of the microcontroller 460 and the NOT gate circuit 463, the microcontroller 460 can passively diagnose whether any of the first STO module 44 and the second STO module 55 is malfunctioned due to abnormal circuit components, so as to take necessary protective measures or process when any faulty problem occurs in any of the STO modules. Thus, the safety of the motor drive system 4 is further improved.

Figure 7:
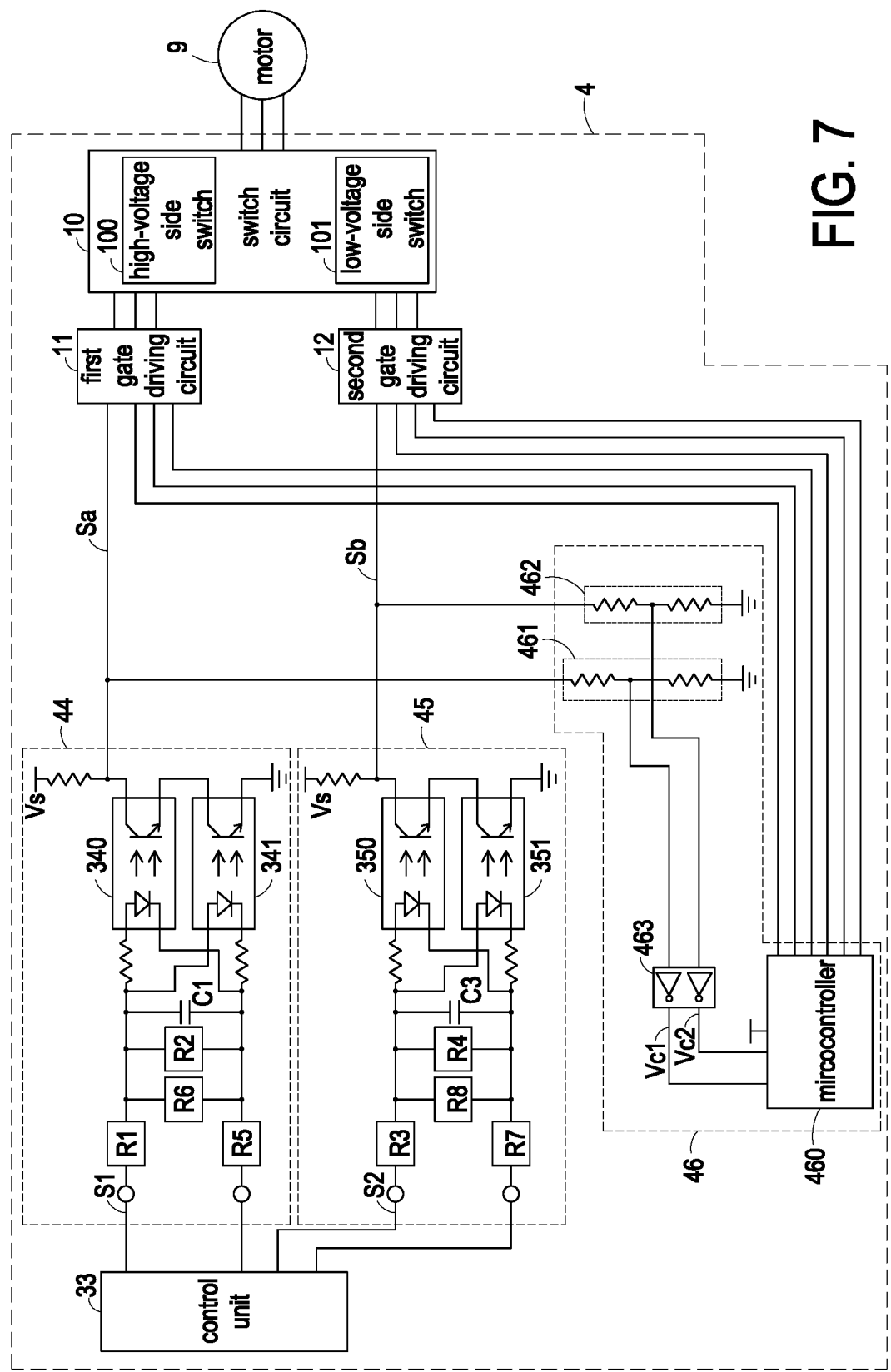
FIG. 7 is a circuit diagram illustrating a motor drive system according to a sixth embodiment of the present disclosure.

FIG. 7 is a circuit diagram illustrating a motor drive system according to a sixth embodiment of the present disclosure. Please refer to FIGS. 6 and 7, in the embodiment shown in FIG. 6, the first STO module 44 has the input terminal of the first optical coupler 340 of the first coupling module and the input terminal of the second optical coupler 341 of the first coupling module which are connected in series, and the second STO module 45 has the input terminal of the first optical coupler 350 of the second coupling module and the input terminal of the second optical coupler 351 of the second coupling module which are connected in series. Different from the embodiment shown in FIG. 6, in some embodiments as shown in FIG. 7, the first STO module 44 has the input terminal of the first optical coupler 340 of the first coupling module and the input terminal of the second optical coupler 341 of the first coupling module which are connected in parallel, and the second STO module 45 has the input terminal of the first optical coupler 350 of the second coupling module and the input terminal of the second optical coupler 351 of the second coupling module which are connected in parallel. However, the present disclosure is not limited thereto and not redundantly described herein.

In summary, the present disclosure provides a motor drive system. The motor drive system includes two STO modules to achieve a two-channel STO redundancy infrastructure, so that the safety of the motor drive system is improved. In addition, the motor drive system further diagnoses malfunction of the two STO modules, that is, to diagnose whether there is a failure problem with the STO modules. Thus, the necessary protection measures or process can be taken when there is a failure problem with any of the STO modules. In this way, the safety of the motor drive system is further improved. Moreover, it benefits to improve the safety of the STO modules, and perform a fault diagnosis in advance when the STO module may have malfunctions, so as to ensure the STO modules meet the related safety requirements of the average diagnostic coverage (DCavg) and the safe failure fraction (SFF).

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor drive system for driving a motor, comprising:
   a control unit;
   a first safe torque off (STO) module comprising a first coupling module and electrically connected to the control unit for receiving a first control signal from the control unit, the first STO module converting the first control signal to a first driving signal;
   a second STO module comprising a second coupling module and electrically connected to the control unit for receiving a second control signal from the control unit, the second STO module converting the second control signal to a second driving signal;
   a first gate driving circuit electrically connected to the first STO module for receiving the first driving signal, the first gate driving circuit driving a high-voltage side switch, the high-voltage side switch electrically connected to the motor;
   a second gate driving circuit electrically connected to the second STO module for receiving the second driving signal, the second gate driving circuit driving a low-voltage side switch, the low-voltage side switch electrically connected to the motor; and
   a diagnosis module comprising a microcontroller and electrically connected to the first STO module and the second STO module for capturing the first driving signal and the second driving signal respectively, the diagnosis module comparing the first driving signal and the second driving signal to output a compared result;
   wherein the microcontroller determines whether at least one of the first STO module and the second STO module is malfunctioned according to the compared result.

2. The motor drive system according to claim 1, wherein the first STO module comprises:
- a first current-limiting resistor electrically connected to the control unit;
- a second current-limiting resistor electrically connected between the first current-limiting resistor and the control unit;
- a first filtering capacitor connected in parallel with the second current-limiting resistor;
- a first optical coupler of the first coupling module electrically connected between the first current-limiting resistor and the control unit; and
- a first conversion circuit electrically connected between the first optical coupler of the first coupling module and the first gate driving circuit, and configured to output the first driving signal according to the first control signal; and wherein the second STO module comprises:
- a third current-limiting resistor electrically connected to the control unit;
- a fourth current-limiting resistor electrically connected between the third current-limiting resistor and the control unit;
- a second filtering capacitor connected in parallel with the fourth current-limiting resistor;
- a first optical coupler of the second coupling module electrically connected between the third current-limiting resistor and the control unit; and
- a second conversion circuit electrically connected between the first optical coupler of the second coupling module and the second gate driving circuit, and configured to output the second driving signal according to the second control signal.

3. The motor drive system according to claim 2, wherein the first conversion circuit comprises:
- a first regulating resistor electrically connected between the first optical coupler of the first coupling module and a voltage source;
- a second regulating resistor electrically connected between the first regulating resistor and the first optical coupler of the first coupling module;
- a first PNP bipolar transistor comprising a base electrode electrically connected to the second regulating resistor, an emitter electrode electrically connected to the voltage source and a collector electrode electrically connected to the first gate driving circuit;
- a first voltage-stabilizing capacitor electrically connected between the collector electrode of the first PNP bipolar transistor and a ground terminal; and
- a third regulating resistor electrically connected between the collector electrode of the first PNP bipolar transistor and the ground terminal, and in parallel with the first voltage-stabilizing capacitor; and wherein the second conversion circuit comprises:
- a fourth regulating resistor electrically connected between the first optical coupler of the second coupling module and a voltage source;
- a fifth regulating resistor electrically connected between the second regulating resistor and the first optical coupler of the second coupling module;
- a second PNP bipolar transistor comprising a base electrode electrically connected to the fifth regulating resistor, an emitter electrode electrically connected to the voltage source and a collector electrode electrically connected to the second gate driving circuit;
- a second voltage-stabilizing capacitor electrically connected between the collector electrode of the second PNP bipolar transistor and the ground terminal; and
- a sixth regulating resistor electrically connected between the collector electrode of the second PNP bipolar transistor and the ground terminal, and in parallel with the second voltage-stabilizing capacitor.

4. The motor drive system according to claim 3, wherein the diagnosis module further comprises a NOR gate circuit, the NOR gate circuit calculates the first driving signal and the second driving signal to output a diagnostic signal to the control unit, the control unit compares the diagnostic signal, the first control signal and the second control signal to determine if the first STO module or the second STO module is malfunctioned.

5. The motor drive system according to claim 4, wherein the first conversion circuit further comprises:
- a seventh regulating resistor electrically connected to the voltage source;
- a first NPN bipolar transistor comprising a base electrode electrically connected to the first regulating resistor, an emitter electrode electrically connected to the ground terminal and a collector electrode electrically connected to the seventh regulating resistor;
- an eighth regulating resistor connected to the voltage source; and
- a second NPN bipolar transistor comprising a base electrode electrically connected between the seventh regulating resistor and the collector electrode of the first NPN bipolar transistor, an emitter electrode electrically connected to the ground terminal and a collector electrode electrically connected to the eighth regulating resistor; and wherein the second conversion circuit further comprises:
- a ninth regulating resistor electrically connected to the voltage source;
- a third NPN bipolar transistor comprising a base electrode electrically connected to the fourth regulating resistor, an emitter electrode electrically connected to the ground terminal and a collector electrode electrically connected to the ninth regulating resistor;
- a tenth regulating resistor connected to the voltage source; and
- a fourth NPN bipolar transistor comprising a base electrode electrically connected between the ninth regulating resistor and the collector electrode of the third NPN bipolar transistor, an emitter electrode electrically connected to the ground terminal and a collector electrode electrically connected to the tenth regulating resistor.

6. The motor drive system according to claim 3, wherein the first STO module further comprises:
- a fifth current-limiting resistor electrically connected the control unit;
- a sixth current-limiting resistor electrically connected in series between the first current-limiting resistor and the fifth current-limiting resistor, and connected in parallel with the second current-limiting resistor;
- a second optical coupler of the first coupling module electrically connected to the first optical coupler of the first coupling module, wherein the first optical coupler of the first coupling module is electrically connected between the first current-limiting resistor and the first regulating resistor, the second optical coupler of the first coupling module is electrically connected between the fifth current-limiting resistor and the ground terminal of the first conversion circuit; and wherein the second STO module further comprises:

a seventh current-limiting resistor electrically connected the control unit;

an eighth current-limiting resistor electrically connected in series between the third current-limiting resistor and the seventh current-limiting resistor, and connected in parallel with the fourth current-limiting resistor; and a second optical coupler of the second coupling module electrically connected to the first optical coupler of the second coupling module, wherein the first optical coupler of the second coupling module is electrically connected between the third current-limiting resistor and the fourth regulating resistor, the second optical coupler of the second coupling module is electrically connected between the seventh current-limiting resistor and the ground terminal of the second conversion circuit.

7. The motor drive system according to claim 6, wherein the first optical coupler and the second optical coupler of the first coupling module is electrically connected in series or in parallel; and wherein the first optical coupler and the second optical coupler of the second coupling module is electrically connected in series or in parallel.

8. The motor drive system according to claim 1, wherein the first STO module comprises:

a first current-limiting resistor electrically connected to the control unit;

a second current-limiting resistor electrically connected between the first current-limiting resistor and the control unit;

a first filtering capacitor connected in parallel with the second current-limiting resistor;

a first optical coupler of the first coupling module electrically connected between the first current-limiting resistor and the first gate driving circuit; and wherein the second STO module comprises:

a third current-limiting resistor electrically connected to the control unit;

a fourth current-limiting resistor electrically connected between the third current-limiting resistor and the control unit;

a second filtering capacitor connected in parallel with the fourth current-limiting resistor;

a first optical coupler of the second coupling module electrically connected between the third current-limiting resistor and the second gate driving circuit;

wherein the first STO module further comprises:

a fifth current-limiting resistor electrically connected the control unit;

a sixth current-limiting resistor electrically connected in series between the first current-limiting resistor and the fifth current-limiting resistor, and connected in parallel with the second current-limiting resistor; and a second optical coupler of the first coupling module electrically connected to the first optical coupler of the first coupling module, and electrically connected between the fifth current-limiting resistor and a ground terminal; and wherein the second STO module further comprises:

a seventh current-limiting resistor electrically connected the control unit;

an eighth current-limiting resistor electrically connected in series between the third current-limiting resistor and the seventh current-limiting resistor, and connected in parallel with the fourth current-limiting resistor; and a second optical coupler of the second coupling module electrically connected to the first optical coupler of the second coupling module, and electrically connected between the seventh current-limiting resistor and the ground terminal.

9. The motor drive system according to claim 8, wherein the first optical coupler and the second optical coupler of the first coupling module is electrically connected in series or in parallel; and wherein the first optical coupler and the second optical coupler of the second coupling module is electrically connected in series or in parallel.

10. A control method for a motor drive system, comprising:

outputting, by a control unit, a first control signal and a second control signal to a first safe torque off (STO) module and a second STO module respectively;

outputting, by the first STO module, a first driving signal according to the first control signal;

outputting, by the second STO module, a second driving signal according to the second control signal;

comparing, by a diagnosis module, the first driving signal and the second driving signal to output a compared result to a microcontroller;

determining, by the microcontroller, that the first STO module and the second STO module are operated normally according to the compared result in which the first driving signal and the second driving signal are identical when the first control signal and the second control signal are at the same voltage level; and determining, by the microcontroller, malfunction of at least one of the first STO module and the second STO module according to the compared result in which the first driving signal and the second driving signal are distinct when the first control signal and the second control signal are at the same voltage level.

11. The control method according to claim 10, wherein the step of determining malfunction of at least one of the first STO module and the second STO module according to the compared result comprises: determining, by the microcontroller, malfunction of at least one of the first STO module and the second STO module when the first driving signal and the second driving signal are at distinct voltage levels.

12. The control method according to claim 11, further comprising:

performing, by the diagnosis module, a first NOR operation based on the first driving signal and the second driving signal to output a diagnostic signal to the control unit;

performing, by the control unit, a second NOR operation based on the first control signal and the second control signal to output a reference signal, wherein the first control signal is at a high voltage level or a low voltage level, and the second control signal is at the high voltage level or the low voltage level;

comparing, by the control unit, the diagnostic signal and the reference signal; and determining, by the control unit, malfunction of at least one of the first STO module and the second STO module when the diagnostic signal is not matched with the reference signal.

13. The control method according to claim 10, further comprising:

outputting, by the first STO module, a first inner signal according to the first control signal, and outputting the first driving signal according to the first inner signal;

outputting, by the second STO module, a second inner signal according to the second control signal, and outputting the second driving signal according to the second inner signal; and comparing, by the diagnosis module, each two of the first inner signal, the first driving signal, the second inner signal and the second driving signal to output the compared result to the microcontroller.

14. The control method according to claim 13, wherein the step of determining malfunction of at least one of the first STO module and the second STO module according to the compared result comprises:

determining, by the microcontroller, malfunction of the first STO module when the compared result in which the first inner signal and the first driving signal are at the same voltage level; and determining, by the microcontroller, malfunction of the second STO module when the compared result in which the second inner signal and the second driving signal are at the same voltage level.

15. The control method according to claim 13, wherein the step of determining malfunction of at least one of the first STO module and the second STO module according to the compared result comprises:

determining, by the microcontroller, malfunction of at least one of the first STO module and the second STO module when the compared result in which the first inner signal and the second inner signal are at distinct voltage levels.

* * * * *